(12) United States Patent
Ando et al.

(10) Patent No.: US 10,761,400 B2
(45) Date of Patent: Sep. 1, 2020

(54) WAVELENGTH CONVERSION APPARATUS AND WAVELENGTH CONVERSION METHOD

(71) Applicant: Lasertec Corporation, Yokohama, Kanagawa (JP)

(72) Inventors: Akihiro Ando, Yokohama (JP); Jun Sakuma, Yokohama (JP)

(73) Assignee: LASERTEC CORPORATION, Yokohama (JP)

( * ) Notice: Subject to any disclaimer, the term of this patent is extended or adjusted under 35 U.S.C. 154(b) by 0 days.

(21) Appl. No.: 16/575,122

(22) Filed: Sep. 18, 2019

(65) Prior Publication Data

US 2020/0089079 A1    Mar. 19, 2020

(30) Foreign Application Priority Data

Sep. 18, 2018 (JP) ................................ 2018-173402

(51) Int. Cl.
*G02F 1/35* (2006.01)
*G02F 1/355* (2006.01)
*G02F 1/37* (2006.01)

(52) U.S. Cl.
CPC .......... *G02F 1/3501* (2013.01); *G02F 1/3534* (2013.01); *G02F 1/3551* (2013.01); *G02F 1/37* (2013.01); *G02F 2001/3503* (2013.01); *G02F 2001/3505* (2013.01); *G02F 2001/3507* (2013.01)

(58) Field of Classification Search
CPC .... G02F 1/3501; G02F 1/3534; G02F 1/3551; G02F 1/37; G02F 2001/3503; G02F 2001/3505; G02F 2001/3507
See application file for complete search history.

(56) References Cited

U.S. PATENT DOCUMENTS 6,404,786 B1    6/2002 Kondo et al.
6,494,584 B1 *  12/2002 Wada .................. G03F 7/70883
                                                          359/507

(Continued)

FOREIGN PATENT DOCUMENTS

EP          1072938 A2    1/2001
JP          H11167132 A   6/1999

(Continued)

OTHER PUBLICATIONS

Japanese Patent Office, Office Action Issued in Application No. 2018-173402, dated Mar. 5, 2019, 5 pages.

(Continued)

*Primary Examiner* — Daniel Petkovsek
(74) *Attorney, Agent, or Firm* — McCoy Russell LLP

(57) ABSTRACT

A wavelength conversion apparatus and a wavelength conversion method that can stably output wavelength converted light for a long time are provided. A wavelength conversion apparatus 100 according to an aspect of the present disclosure includes a casing 10, a wavelength conversion element 25 disposed inside the casing 10 and configured to convert a wavelength of incident light and output light with the converted wavelength, a first port 11 that introduces a first gas containing 99.9% or more of a nitrogen gas inside the casing 10, and a second port 12 that introduces a second gas containing 1% or more of an oxygen gas.

3 Claims, 3 Drawing Sheets

(56) References Cited

U.S. PATENT DOCUMENTS

| | | | |
|---|---|---|---|
| 6,667,828 B2 * | 12/2003 | Shull | H01S 3/109 359/330 |
| 7,142,354 B2 * | 11/2006 | Kojima | G02F 1/3501 359/326 |
| 2005/0225837 A1 | 10/2005 | Kojima et al. | |
| 2014/0146838 A1 | 5/2014 | Germanenko et al. | |

FOREIGN PATENT DOCUMENTS

| | | |
|---|---|---|
| JP | 2001042369 A | 2/2001 |
| JP | 2001051311 A | 2/2001 |
| JP | 2008298832 A | 12/2008 |
| JP | 2015536487 A | 12/2015 |
| WO | 0248786 A1 | 6/2002 |
| WO | 2014085339 A1 | 6/2014 |

OTHER PUBLICATIONS

Japanese Patent Office, Office Action Issued in Application No. 2018-173402, dated Jul. 2, 2019, 5 pages.

* cited by examiner

WAVELENGTH CONVERSION APPARATUS AND WAVELENGTH CONVERSION METHOD

CROSS REFERENCE TO RELATED APPLICATIONS

The present application claims priority to Japanese Application No. 2018-173402, entitled "WAVELENGTH CONVERSION APPARATUS AND WAVELENGTH CONVERSION METHOD", and filed on Sep. 18, 2018. The entire contents of the above-listed application are hereby incorporated by reference in their entirety for all purposes.

TECHNICAL FIELD

The present disclosure relates to a wavelength conversion apparatus and a wavelength conversion method.

BACKGROUND

Japanese Unexamined Patent Application Publication No. H11-167132 discloses an optical system that generates ultraviolet light using a nonlinear optical crystal. Japanese Unexamined Patent Application Publication No. H11-167132 discloses that the atmosphere of the nonlinear optical crystal is 99.9% or more of nitrogen. Alternatively, in Japanese Unexamined Patent Application Publication No. H11-167132, the atmosphere of the nonlinear optical crystal is 99.9% of dry air.

Published Japanese Translation of PCT International Publication for Patent Application, No. 2015-536487 discloses a laser based illumination system that supplies humidified purge gas to a resonant cavity including a nonlinear crystal. Specifically, the purge gas flows through a humidity injection system to thereby be provided with water vapor. The purge gas is, for example, dry air free of contamination, nitrogen, or other combinations of inert gases.

SUMMARY

When such a nonlinear optical crystal is used, there is a problem that an output of wavelength converted light from the nonlinear optical crystal decreases as the time passes. When oxygen is present in the atmosphere, there is another problem that ozone is generated by irradiation of ultraviolet light.

The present disclosure has been made in view of such circumstances. The present disclosure provides a wavelength conversion apparatus and a wavelength conversion method that can stably output wavelength converted light for a long time.

In an example aspect of this embodiment, a wavelength conversion apparatus includes a casing; a wavelength conversion element disposed inside the casing and configured to convert a wavelength of incident light and output light with the converted wavelength; and gas supply means for introducing, into an internal space of the casing, a gas in which a ratio of an oxygen gas to a nitrogen gas falls within a range between 1/9999 to 1/99. With such a configuration, it is possible to stably output wavelength converted light for a long time.

In the above wavelength conversion apparatus, the casing preferably includes a first port that introduces a first gas containing 99.9% or more of a nitrogen gas, and a second port that introduces a second gas containing 1% or more of an oxygen gas. With such a configuration, it is possible to stably output wavelength converted light for a long time.

In an example aspect of this embodiment, a wavelength conversion apparatus includes: a casing; a wavelength conversion element disposed inside the casing and configured to convert a wavelength of incident light and output light with the converted wavelength; a first port that introduces a first gas containing 99.9% or more of a nitrogen gas into an internal space of the casing; and a second port that introduces a second gas containing 1% or more of an oxygen gas. With such a configuration, it is possible to stably output wavelength converted light for a long time.

In the above wavelength conversion apparatus, an ejection opening for the second gas is preferably provided closer to the wavelength conversion element than an ejection opening for the first gas. This prevents contamination by ozone.

Two wavelength conversion elements are preferably provided in the casing, and the ejection opening that ejects the second gas is preferably provided for each of the two wavelength conversion elements. With such a configuration, it is possible to stably output wavelength converted light for a long time.

In an example aspect of this embodiment, a wavelength conversion method includes: introducing, into a casing, a gas in which a ratio of an oxygen gas to a nitrogen falls within a range of 1/9999 to 1/99; and making incident light enter a wavelength conversion element disposed inside the casing while introducing the gas into the casing to thereby generate wavelength converted light. With such a configuration, it is possible to stably output wavelength converted light for a long time.

In the above wavelength conversion method, the casing preferably includes a first port that introduces a first gas containing 99.9% or more of a nitrogen gas, and a second port that introduces a second gas containing 1% or more of an oxygen gas. With such a configuration, it is possible to stably output wavelength converted light for a long time.

In an example aspect of this embodiment, a wavelength conversion method includes: introducing a second gas containing 1% or more of an oxygen gas from a second port into a casing while introducing a first gas containing 99.9% or more of a nitrogen gas from a first port into the casing; and making incident light enter a wavelength conversion element disposed inside the casing while introducing the first gas and the second gas into the casing to thereby generate wavelength converted light. With such a configuration, it is possible to stably output wavelength converted light for a long time.

In the above wavelength conversion apparatus, an ejection opening of the second port is preferably disposed closer to the wavelength conversion element than an ejection port of the first port. This prevents contamination by ozone.

In the above wavelength conversion apparatus, two wavelength conversion elements are preferably provided inside the casing, and the ejection opening that ejects a second gas is preferably provided for each of the two wavelength conversion elements. With such a configuration, it is possible to stably output wavelength converted light for a long time.

According to the present disclosure, it is possible to provide a wavelength conversion apparatus and a wavelength conversion method that can stably output wavelength converted light for a long time.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Figure 1:
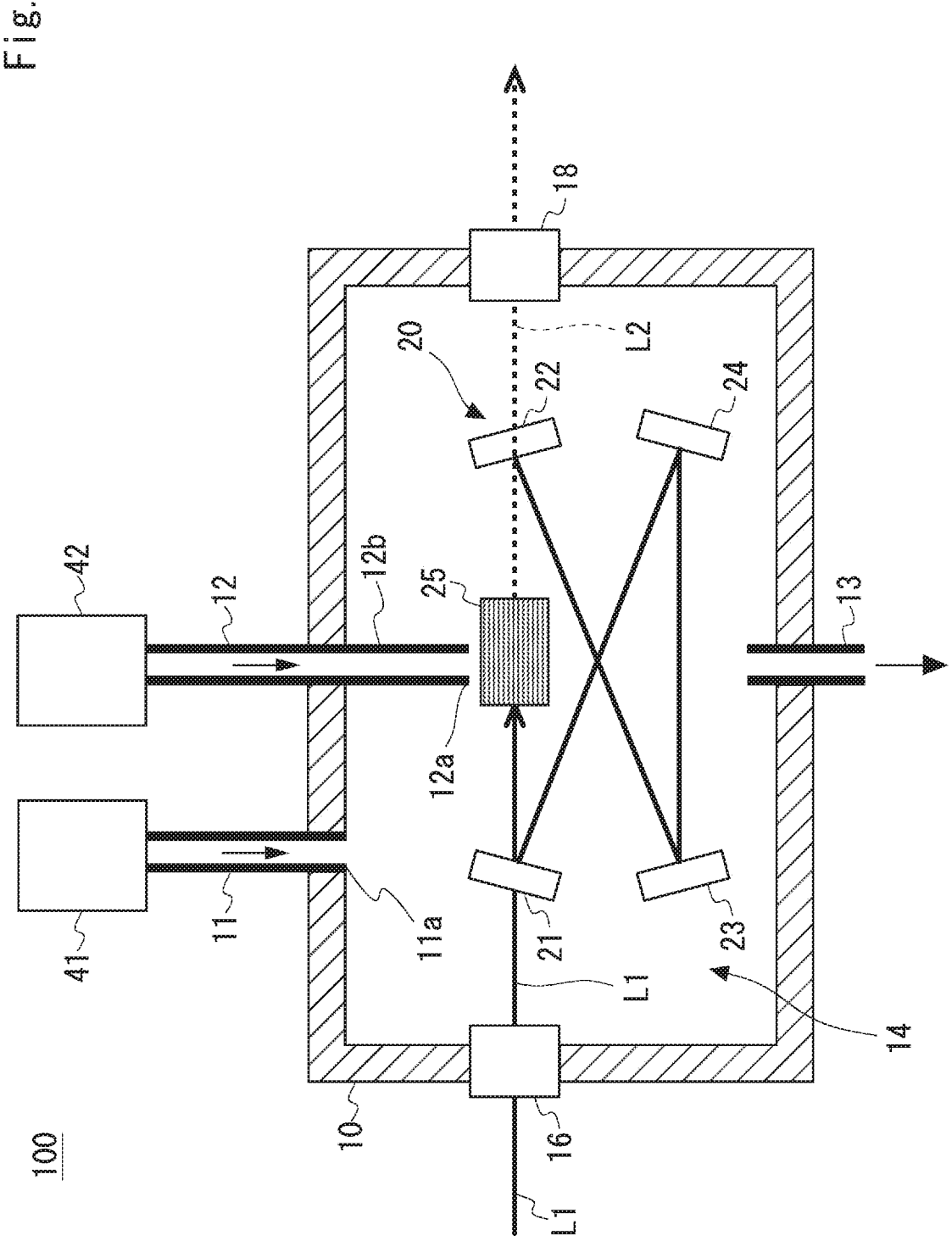
FIG. 1 is a schematic diagram showing a configuration of a wavelength conversion apparatus according to a first embodiment.

Hereinafter, an example of embodiments of the present disclosure will be described with reference to the drawings. The following descriptions show preferred embodiments of the present disclosure, and the technical scope of the present disclosure is not limited to the following embodiments. In the drawings, the same or corresponding elements are denoted by the same reference signs, and repeated descriptions will be omitted as appropriate for the clarity of the descriptions.

First Embodiment

A configuration of a wavelength conversion apparatus 100 according to this embodiment will be described with reference to FIG. 1. FIG. 1 is a diagram schematically showing the configuration of the wavelength conversion apparatus 100. The wavelength conversion apparatus 100 includes a casing 10 and an external resonator 20.

The casing 10 is a chamber including a first port 11, a second port 12, and an exhaust port 13. The casing 10 further includes a window 16 and a window 18. The window 16 and the window 18 are made of a transparent material that transmits a laser beam L1. The laser beam L1 serving as a fundamental wave passes through the window 16 and enters an internal space 14 inside the casing 10.

A wavelength of the laser beam L1 is 420 nm to 600 nm. Specifically, the laser beam L1 is a continuous output laser beam having a wavelength of 532 nm or a wavelength of 488 nm. That is, the laser beam L1 is a CW (Continuous Wave) laser beam. The laser beam L1 is longitudinal single mode light or longitudinal multimode light. The laser beam L1 is incident light entering a wavelength conversion element 25, which will be described later.

The external resonator 20 is disposed in the internal space 14 of the casing 10. Wavelength converted light L2 extracted from the external resonator 20 passes through the window 18 and is extracted to the outside of the casing 10. The external resonator 20 is a ring-type external resonator including four optical mirrors 21 to 24. The optical mirrors 21 to 24 are, for example, highly reflective mirrors. The optical mirrors 21 and 22 are flat mirrors. The optical mirrors 23 and 24 are concave mirrors. The wavelength conversion element 25 is disposed inside the external resonator 20.

The laser beam L1, which is the fundamental wave, is guided inside the external resonator 20 from a rear surface of the optical mirror 21, which is a partially reflective mirror. The laser beam L1 introduced into the external resonator 20 is repeatedly reflected at the optical mirror 21, the optical mirror 22, the optical mirror 23, and the optical mirror 24 in order. Then, the laser beam L1 circulates inside the external resonator 20, which makes the laser beam L1 resonate. This improves the intensity of the laser beam L1.

Further, the wavelength conversion element 25 is disposed in a light path from the optical mirror 21 to the optical mirror 22. The wavelength conversion element 25 is, for example, a nonlinear optical crystal such as a BBO ($\beta$-BaB2O4) crystal, an LBO (LiB3O5) crystal, or a CLBO (CsLiB6O10) crystal. The wavelength conversion element 25 converts the wavelength of the laser beam L1, which is the incident light, to generate the wavelength converted light L2. In this example, a BBO crystal is used as the wavelength conversion element 25. The wavelength conversion element 25 generates a second harmonic of the laser beam L1 as the wavelength converted light L2.

When the wavelength of the laser beam L1 is 420 nm to 600 nm, the wavelength of the wavelength converted light L2 is 210 nm to 300 nm. To be more specific, when the wavelength of the laser beam L1 is 532 nm, the wavelength converted light L2 is an ultraviolet laser light having a wavelength of 266 nm. When the wavelength of the laser beam L1 is 488 nm, the wavelength converted light L2 is an ultraviolet laser light having a wavelength of 244 nm. By properly maintaining an angle and a temperature of the wavelength conversion element 25, a phase matching condition for the generation of the second harmonic is satisfied. The types of the wavelength conversion include, for example, second harmonic generation and sum frequency generation. Further, resonance is maintained by driving the optical mirror 22 by an actuator or the like. This enhances the power of the laser beam L1 inside the external resonator 20.

The wavelength converted light L2 generated by the wavelength conversion element 25 is extracted from the optical mirror 22. To the optical mirror 22, a highly reflective film is applied for the wavelength (420 nm to 600 nm) of the first laser beam L1, and an antireflective film is applied for the wavelength (210 nm to 300 nm) of the wavelength converted light L2. Note that a dichroic mirror or the like that reflects the laser beam L1 and transmits the wavelength converted light L2 may be used as the optical mirror 22. Then, the wavelength converted light L2 generated inside the casing 10 is extracted from the window 18 to the outside. The wavelength converted light L2 is used for an optical inspection apparatus such as a photomask.

The first port 11 is provided in a side wall of the casing 10. The first port 11 serves as an introduction opening for introducing a first gas into the casing 10. In order to enable the first port 11 to introduce the first gas into the casing 10, first gas supply means 41 is attached to the first port 11. The first gas supply means 41 is a gas cylinder or the like that supplies the first gas. The first gas is ejected from an ejection opening 11a at the end of the first port 11 into the casing 10. That is, the first gas from the first gas supply means 41 is introduced into the internal space 14 through the first port 11.

The first gas is a gas containing 99% or more of a nitrogen gas (N2 gas). For example, the first gas is a dry nitrogen gas. Thus, a nitrogen gas is supplied to the internal space 14 of the casing 10. A flow rate of the first gas is, for example, 3 l/min.

The second port 12 is provided in the side wall of the casing 10. The second port 12 serves as an introduction opening for introducing the second gas into the casing 10. Second gas supply means 42 is attached to the second port 12. The second gas supply means 42 is a gas cylinder or the like that supplies the second gas. The second gas is ejected from an ejection opening 12a at an end of the second port 12 into the casing 10. That is, the second gas from the second gas supply means 42 is introduced into the internal space 14 through the second port 12.

The second gas is a gas containing 1% or more of an oxygen gas (O2 gas). The second gas is, for example, dry air. Thus, dry air is supplied to the internal space 14 of the casing 10. A flow rate of the second gas is smaller than the flow rate of the first gas. The flow rate of the second gas is, for example, 0.15 l/min. Since the ratio of a nitrogen gas to an oxygen gas in the air is about 4:1, the flow rate of oxygen gas is 0.03 l/min.

The ejection opening 12a for the second gas is disposed in the vicinity of the wavelength conversion element 25. The second port 12 includes a gas pipe 12b extending inside the internal space 14 of the casing 10. The gas pipe 12b extends from the side wall of the casing 10 to the vicinity of the wavelength conversion element 25. With such a configuration, the second gas is ejected from the ejection opening 12a toward the wavelength conversion element 25.

The exhaust port 13 is provided in the side wall of the casing 10. The exhaust port 13 is connected to an external space of the casing 10. Thus, the gas inside the internal space 14 of the casing is discharged to the external space through the exhaust port 13. The external space is, for example, at an atmospheric pressure. Thus, the pressure of the internal space 14 is maintained at a pressure higher than the atmospheric pressure. That is, in the internal space 14, a mixed gas of the first gas and the second gas is maintained at a pressure higher than the atmospheric pressure.

In this way, the internal space 14 of the casing 10 is purged with the first gas and the second gas. That is, the internal space 14 of the casing 10 is filled with the first gas and the second gas. The laser beam L1 is made to be incident on the wavelength conversion element 25 while the first gas and the second gas are being introduced into the casing 10. In this way, it is possible to effectively prevent the output of the wavelength converted light L2 from decreasing. That is, by introducing the oxygen gas together with the nitrogen gas, it is possible to effectively prevent the wavelength conversion element 25 from deteriorating and being damaged.

Figure 2:
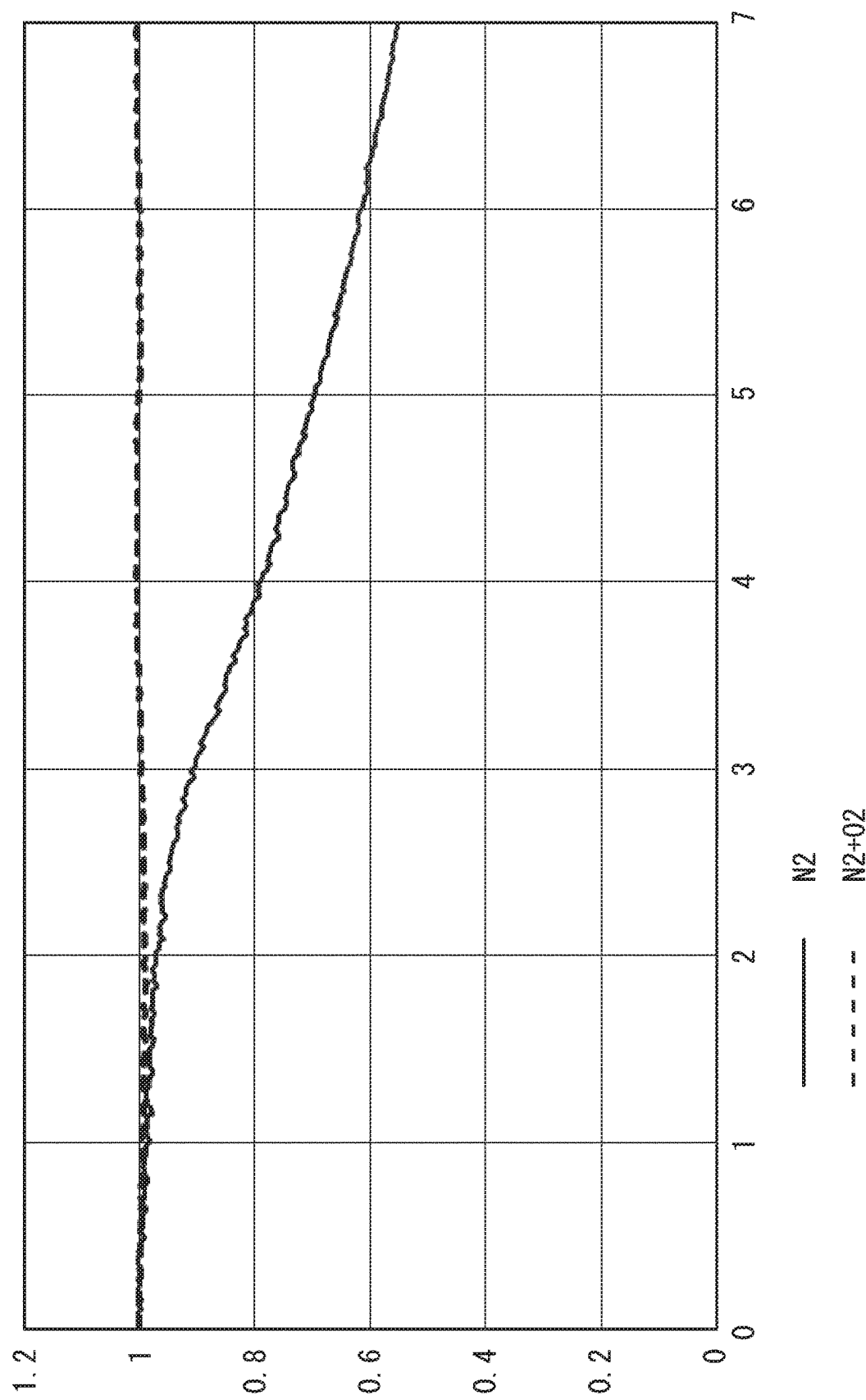
FIG. 2 is a graph showing a change in an output of wavelength converted light.

FIG. 2 is a graph showing a change of the laser output of the wavelength converted light L2. FIG. 2 shows an example (N2) in which only the first gas is introduced, and an example (N2+O2) in which the second gas containing oxygen is added to the first gas. In FIG. 2, the horizontal axis represents time, and the vertical axis represents the output. FIG. 2 is a graph showing a decrease in the output over time, where the output at the start of the operation is 1. As shown in FIG. 2, by performing the wavelength conversion while introducing the first and second gases, it is possible to effectively prevent the output of the wavelength converted light L2 from decreasing.

Further, the ejection opening 12a of the second port 12 is disposed to face the wavelength conversion element 25. With such a configuration, the second gas is ejected from the ejection opening 12a of the second port 12 toward the wavelength conversion element 25. That is, the ejection opening 12a of the second port 12 is disposed closer to the wavelength conversion element 25 than the ejection opening 11a of the first port 11 is. In this way, the wavelength conversion element 25 can be exposed to the oxygen gas without increasing the partial pressure of oxygen gas in the entire internal space 14. That is, the ratio of the oxygen gas to the nitrogen gas in the vicinity of the wavelength conversion element 25 is higher than the ratio of the oxygen gas to the nitrogen gas in the entire internal space 14.

For example, oxygen may be converted into ozone by the wavelength converted light L2 to thereby contaminate the inside of the casing 10. In this embodiment, since the ejection opening 12a is disposed in the vicinity of the wavelength conversion element 25, the second gas is directly ejected to the wavelength conversion element 25. Thus, the wavelength conversion element 25 can be exposed to the oxygen gas without increasing the pressure of the oxygen gas in the internal space 14. It is thus possible to effectively prevent the output of the wavelength converted light L2 from decreasing while effectively preventing generation of ozone.

Although the first gas and the second gas are introduced from different ports in FIG. 1, the first gas and the second gas may be introduced from the same port. That is, a mixed gas of the first gas and the second gas may be introduced. In this case, for example, an ejection opening of the port for the mixed gas is disposed to face the wavelength conversion element 25. By doing so, the wavelength conversion element 25 can be exposed to the oxygen gas.

Furthermore, a gas containing an oxygen gas and a nitrogen gas at a predetermined ratio may be prepared and introduced into the casing 10. The percentage of the nitrogen gas in the gas introduced into the casing 10 is preferably 99% to 99.99% and that of the oxygen gas in the gas introduced into the casing 10 is preferably 0.01% to 1%. That is, when the ratio (volume fraction) of the oxygen gas to the nitrogen gas (oxygen gas/nitrogen gas) is denoted by A, it is preferable to set A within a range of =1/9999 to 1/99. A gas in which the ratio of the oxygen gas to the nitrogen gas is in the range of 1/9999 to 1/99 may be introduced. When the first gas and the second gas are introduced from different ports, the ratio A is a total ratio of the first gas and the second gas.

The gas introduced into the casing 10 may contain gases other than oxygen gas and nitrogen gas as a matter of course. The number of the first ports 11 and second ports 12 is not limited to one, and instead may be two or more. For example, a plurality of the first ports 11 may be provided, and the first gas may be introduced from the plurality of the first ports. Alternatively, a plurality of the second ports 12 may be provided, and the second gas may be introduced from the plurality of the second ports 12.

Second Embodiment

Figure 3:
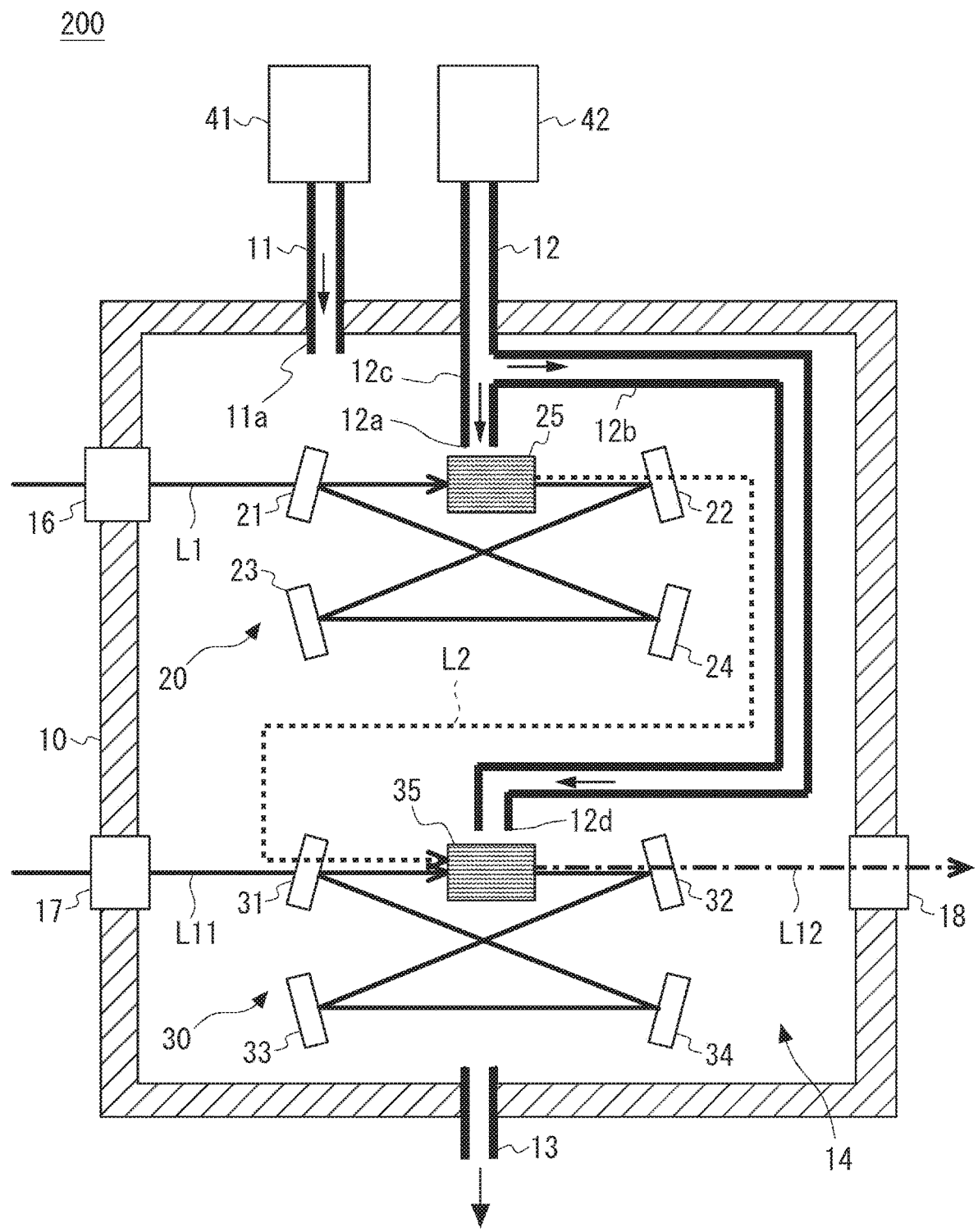
FIG. 3 is a schematic diagram showing a configuration of a wavelength conversion apparatus according to a second embodiment.

A wavelength conversion apparatus 200 according to a second embodiment will be described with reference to FIG. 3. FIG. 3 is a diagram schematically showing a configuration of the wavelength conversion apparatus 200. In this embodiment, two external resonators 20 and 30 are disposed inside the casing 10. The description of the external resonator 20 is omitted, because the external resonator 20 has the same configuration as that according to the first embodiment. Further, the descriptions common to the first embodiment is omitted as appropriate.

The external resonator 30 is a ring-type external resonator including four optical mirrors 31 to 34. A configuration of the external resonator 30 is the same as that of the external resonator 20, and thus a detailed description thereof will be omitted. The wavelength conversion element 35 is disposed in the optical path from the optical mirror 31 to the optical mirror 32. A nonlinear optical crystal such as a BBO (β-BaB2O4) crystal, an LBO (LiB3O5) crystal, or a CLBO (CsLiB6O10) crystal may be used for the wavelength conversion element 35. The wavelength conversion element 35 generates wavelength converted light L12 using a second laser beam L11 and the wavelength converted light L2 as incident light. For example, the wavelength conversion element 35 is a nonlinear optical crystal that generates a sum frequency or a difference frequency of the second laser beam L11 and the wavelength converted light L2.

The casing 10 is provided with windows 16 to 18. The first laser beam L1 enters from the window 16. The first laser beam L1 is guided inside the external resonator 20 in the same manner as the laser beam L1 according to the first embodiment. The wavelength conversion element 25 of the external resonator 20 converts the wavelength of the incident first laser beam L1 and then outputs the wavelength converted light L2. The second harmonic of the first laser beam L1 is emitted from the external resonator 20 as the wavelength converted light L2. The wavelength converted light L2 from the external resonator 20 is guided to the external resonator 30 by a mirror or the like (not shown). That is, the wavelength converted light L2 whose wavelength has been converted by the wavelength conversion element 25 is guided to the external resonator 30 without being extracted from the window 18 to the outside of the casing 10.

The second laser beam L11 enters the window 17. The second laser beam L11 from the window 17 is guided inside the external resonator 30. The wavelength conversion element 35 generates a sum frequency or a difference frequency as the wavelength converted light L12, using the second laser beam L11 and the wavelength converted light L2 as incident light. The wavelength converted light L12 whose wavelength has been converted by the wavelength conversion element 35 is extracted from the optical mirror 32. The wavelength converted light L12 from the external resonator 30 is extracted from the window 18 to the outside of the casing 10. The wavelength converted light L12 is used as illumination light for optical inspection such as a photomask.

In the second embodiment as well, the casing 10 is provided with the first port 11 and the second port 12. Like in the first embodiment, a first gas containing 99% or more of a nitrogen gas is introduced into the internal space 14 from the first port 11. A second gas containing 1% or more of an oxygen gas is introduced into the internal space 14 from the second port 12.

Further, in the second port 12, a branch part 12c is provided in the gas pipe 12b. The second gas is ejected from the ejection opening 12a, which is at an end of one gas pipe 12b branched at the branch part 12c, to the wavelength conversion element 25. The second gas is ejected from the ejection opening 12d, which is at an end of the other gas pipe 12b branched at the branch part 12c, to the wavelength conversion element 35. In this way, the ejection openings 12a and 12d for the second gas are provided, respectively, for the two wavelength conversion elements 25 and 35.

The ejection opening 12a is disposed closer to the wavelength conversion element 25 than the ejection opening 11a and the ejection opening 12d. The ejection opening 12d is disposed closer to the wavelength conversion element 35 than the ejection opening 11a and the ejection opening 12a. In this way, the second gas is directly ejected to the wavelength conversion element 25 and the wavelength conversion element 35. Thus, the wavelength conversion element 25 and the wavelength conversion element 35 can be exposed to the oxygen gas without increasing the pressure of the oxygen gas in the internal space 14. It is thus possible to effectively prevent the output of the wavelength converted light L2 and the wavelength converted light L12 from decreasing. Moreover, it is possible to effectively prevent ozone from being generated, because the oxygen in the internal space 14 can be maintained at a low pressure.

In the above descriptions, although the two ejection openings 12a and 12d are provided by providing the branch part 12c in the gas pipe 12b, the means for providing the two ejection openings is not limited to this. For example, two second ports 12 may be provided in the casing 10, and the gas pipes may be extended from the respective second ports. With such a configuration, the oxygen gas can be directly ejected to each of the plurality of wavelength conversion element 25 and the wavelength conversion element 35. Furthermore, the gases ejected to the wavelength conversion element 25 and the wavelength conversion element 35 may be different from each other. Three or more wavelength conversion elements may be provided as a matter of course. In this case, it is preferable to provide an ejection opening for the second gas for each of the three or more wavelength conversion elements.

Although the embodiments of the present disclosure have been described above, the present disclosure includes appropriate modifications that do not impair the objects and advantages of the present disclosure, and is not limited by the above embodiments.

The first and second embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. A wavelength conversion apparatus, comprising:
a casing;
an external resonator disposed in an internal space of the casing;
a wavelength conversion element disposed in an optical path of the external resonator inside the casing and configured to convert a wavelength of incident light and output light with the converted wavelength; and
a gas supply means for introducing, into the internal space of the casing, a gas in which a ratio of an oxygen gas to a nitrogen gas falls within a range of 1/9999 to 1/99,
wherein the casing includes a first port and a second port,
the first port introduces a first gas containing 99% or more of a nitrogen gas into the internal space of the casing,
the second port introduces a second gas containing 1% or more of an oxygen gas into the internal space of the casing,
an ejection opening of the second port is disposed closer to the wavelength conversion element than an election opening of the first port so that the second gas is ejected from the opening of the second port toward the wavelength conversion element.

2. The wavelength conversion apparatus according to claim 1, wherein the second gas is dry air.

3. The wavelength conversion apparatus according to claim 1, wherein
two wavelength conversion elements are provided inside the casing, and
the ejection opening that ejects the second gas is provided for each of the two wavelength conversion elements.

* * * * *